United States Patent

Ahn

[11] Patent Number: 6,116,575
[45] Date of Patent: Sep. 12, 2000

[54] SEAT STRUCTURE FOR BALL VALVE

[76] Inventor: Jang Hong Ahn, 301-7, Gaksan-dong, Dong-Ku, Daeku, 701-290, Rep. of Korea

[21] Appl. No.: 09/254,230

[22] PCT Filed: Feb. 24, 1998

[86] PCT No.: PCT/KR98/00035

§ 371 Date: Apr. 23, 1999

§ 102(e) Date: Apr. 23, 1999

[87] PCT Pub. No.: WO99/02904

PCT Pub. Date: Jan. 21, 1999

[30] Foreign Application Priority Data

Jul. 10, 1997 [KR] Rep. of Korea ............ 97/31893

[51] Int. Cl.[7] ............... F16K 25/00; F16K 5/00; F16K 31/00
[52] U.S. Cl. ............ 251/314; 251/173; 251/368; 251/316
[58] Field of Search .................... 251/368, 314, 251/316, 173

[56] References Cited

U.S. PATENT DOCUMENTS

| 2,369,025 | 2/1945 | Cummings | 251/368 |
| 2,762,601 | 9/1956 | Clade | 251/368 |
| 3,333,813 | 8/1967 | Rabe | 251/174 |
| 4,044,994 | 8/1977 | Priese | 251/174 |
| 4,269,391 | 5/1981 | Saito et al. | 251/368 |
| 4,892,320 | 1/1990 | Tückmantel | 277/125 |
| 5,170,993 | 12/1992 | Bonetti | 251/368 |

*Primary Examiner*—Kevin Shaver
*Assistant Examiner*—David A. Bonderer
*Attorney, Agent, or Firm*—Ladas & Parry

[57] ABSTRACT

A seat structure for a ball valve which includes a seat member formed by rolling up an alternate stack of a thin steel plate and a thin graphite plate. The seat member is provided with a fixture portion fixed into an inner periphery of the valve body and a ball contact which is in contact with a surface of a valve ball provided between the inflow vent side and the outflow vent side. The seat structure improves an anti-abrasion and enables a secure functioning of the ball valve at a high temperature and high pressure.

4 Claims, 4 Drawing Sheets

SEAT STRUCTURE FOR BALL VALVE

TECHNICAL FIELD

The present invention relates to a valve seat structure, and more particularly, to a seat structure appropriate for a ball valve in which a friction is repeatedly produced between a ball and a seat.

BACKGROUND ART

A general ball valve is constituted with a valve body, a ball and a handle. The valve body includes an inflow vent through which a fluid comes in, and an outflow vent through which the fluid passes out. The ball is rotatably disposed in an internal space of the valve body so as to open or close the valve which communicates with the inflow vent and outflow vent. Also, the handle controls the rotation of the ball.

A ring type seat is disposed between the internal space of the valve body and the inflow vent and between the internal space of the valve body and the outflow vent to be tight contact with a corresponding peripheral portion of the ball.

Such a ring type seat is conventionally formed of Teflon resin to obtain gastightness and lubricability.

However, the conventional ball valve seat formed of Teflon resin is soft in characteristic and shows a low antiabrasion. Further, considering a repeated friction in the ball valve between the seat and the ball, the Teflon resin seat tends to be easily worn out and subject to deforming when exposed to a high temperature (more than 150° C.) and a high pressure.

DISCLOSURE OF THE INVENTION

Accordingly, it is an object of the present invention to provide a seat structure for a ball valve applicable to an atmosphere of high temperature and high pressure with improved airtightness and lubricability.

To achieve the above-described object, there is provided a seat structure for a ball valve according to the present invention which includes a seat member formed by rolling up an alternate stack of a metallic thin plate and a lubricant non-metallic (graphite, asbestos, Teflon, etc.) thin plate. The seat member is provided with a fixture portion fixed into an inner periphery of the valve body and a ball contact which is to be abutted to a valve ball provided between the inflow vent side and the outflow vent side.

The object and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE PREFERRED EMBODIMENTS

With reference to the accompanying drawings, a seat structure for a ball valve according to the preferred embodiments of the present invention will now be described.

Figure 1:
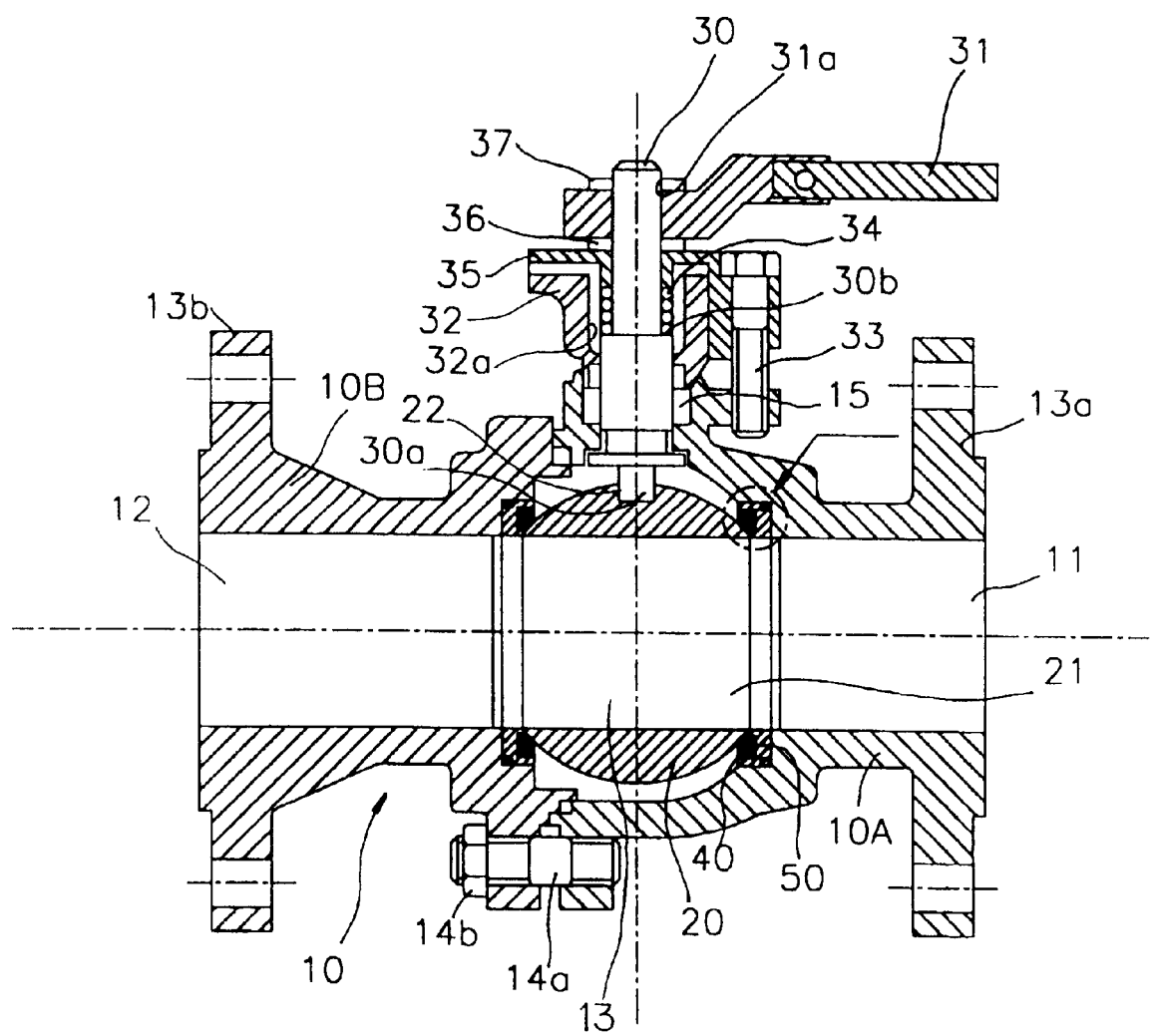
FIG. 1 is a cross-sectional view illustrating a ball valve adopting a seat structure according to a first embodiment of the present invention.
Figure 2:
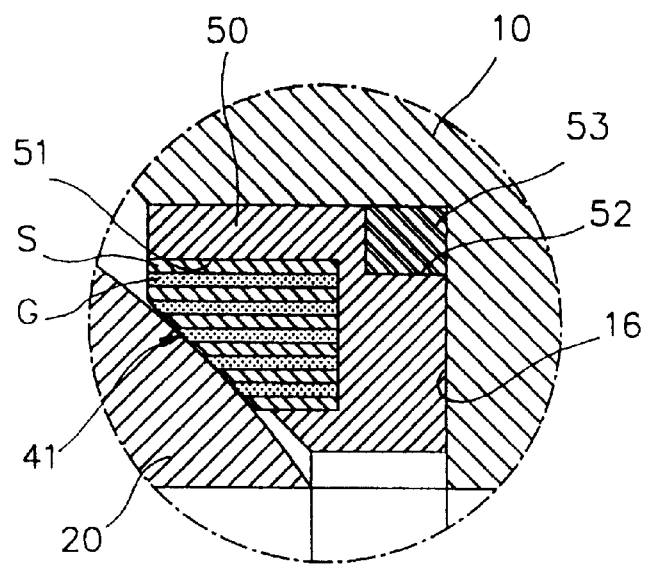
FIG. 2 is an enlarged view detailing portion "A" in the view of FIG. 1.

FIG. 1 is a cross-sectional view illustrating a ball valve adopting a seat structure according to a first embodiment of the present invention, and FIG. 2 is an enlarged view detailing portion "A" in the view of FIG. 1, wherein reference numeral 10 denotes a valve body through which an inflow vent 11 and an output flow vent 12 at each side of an internal space communicate with each other.

The valve body 10 is connected at each side thereof to pipes (not shown) by flanges 13a, 13b.

As shown in FIG. 1, the valve body 10 includes a first body member 10A having a part of the internal space 13 and the inflow vent 11, and a second body member 10B having another part of the internal space 13 and the outflow vent 11. However, the present invention is not limitative to the above valve. For example, the present invention is applicable to a valve including a central member having an internal space, another member having an inflow vent, and still another member having an outflow vent.

Reference numerals 14a, 14b are respectively indicative of a bolt and a nut for connecting the body members 10A and 10B to each other.

A ball 20 having a horizontal hole 21 therethrough is rotatably disposed in the internal space 13. The horizontal hole 21 communicates the inflow vent 11 with the outflow vent 12 when it is rotated by a predetermined degree as shown in FIG. 1. However, when the ball 20 is rotated by 90 degrees from the state shown in FIG. 1, the inflow vent 11 and the outflow vent 12 become blocked to close the valve.

Also, the ball 20 is connected to a control shaft 30 inserted through a hole 15 formed upwardly from above the internal space 13 of the valve body 10. The control shaft 30 is fixedly inserted into an opening 22 formed in the top center of the ball 20 through the hole 15 that is open upwardly from above the internal space 13. A control handle 31 is fixed to an upper portion of the control shaft 30. A lower portion of the control shaft 30 is formed in an sided type such as a square to facilitate the simultaneous rotation of the control shaft 30 and the ball 20.

The control shaft 30 is inserted through a shaft hole 32a formed in a shaft support 32 which is connected by a bolt 33 to the valve body 10. Also, the lower end portion of the control shaft 30 is elastically pressed by a compression spring 34 into the opening 22 formed in the top of the ball 20. The compression spring 34 is supported between a spring protrusion 30b formed on a middle portion of the control shaft 30 and a spring support piece 35 which is fixed at the top of the shaft support 32. The spring support piece 35 is connected by the bolt 33 to the valve body 10 together with the shaft support 32. In order to connect the control handle 31 to the control shaft 30, a washer 36 is worn on an upper portion of the control shaft 30 and the control handle 31 is fitted onto the washer 36, and then a fixture ring 37 is assembled onto the top of the control shaft 30. At this time, engagement holes 31a formed in an upper portion of the control shaft 30 and in a portion of the handle 31 are formed in a sided type such as a square in order for the control shaft 30 to be rotated in correspondence to the turn of the handle 31.

On each side of the internal space 13, a ring type seat member 40 is tightly disposed into the respective inner frame portions of the inflow vent 11 and the outflow vent 12 of the valve body 10.

A thin plate S made of stainless steel or titanium, and a thin graphite plate G are alternately multi-stacked into the ring type seat member 40. A ball contact 41 is formed along a corresponding inner portion of the seat member 40 using a method such as grinding.

In order to form the ring type seat member 40, a thin plate S and a thin graphite plate G are alternately stacked and rolled up into a ring shape to have its cross-section square-typed, and a corresponding inner corner is cut off to obtain the ball contact 41.

Figure 7:
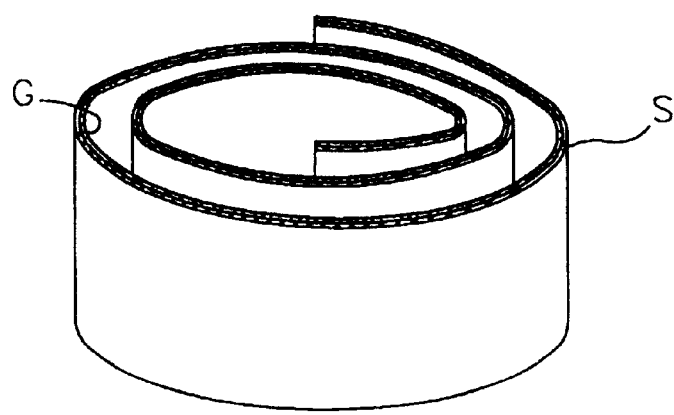
FIG. 7 is a perspective view for illustrating a seat construction process according to the preferred embodiments of the present invention.

Specifically, the seat member 40 is made of thin steel plate S and thin graphite plate G. Initially, as shown in FIG. 7, the thin steel plate S and the thin graphite plate G are alternately stacked and then rolled up into a ring type by attachedly pressing each end portion of the rolled-up ring, Then, the corresponding inner corner of the rolled-up ring is cut off to obtain the ball contact 41, wherein a lathing method or a grinding method is employed to have the ball contact 41 corresponding to a required peripheral portion of the ball 20.

More specifically, the cut-off section, that is, the ball contact 41 of the seat member 40 becomes in contact with the corresponding peripheral portion of the ball 20, so that the respective thin plates S, G forming the ball contact 41 are alternately contacted onto the periphery of the ball 20.

The seat member 40 may be directly inserted into the valve body 10 by forming an appropriate recess in a corresponding portion of each frame of the inflow vent 11 and the outflow vent 12 of the valve body 10. Considering a difficulty in fabricating such a seat structure, however, a seat holder 50 with a seat planting recess 51 formed therein is prepared as illustrated in FIG. 2, and the seat member 40 is inserted into the seat planting recess 51, wherein the ball contact 41 of the seat member 40 is externally protruded. Here, the seat holder 50 is preferably formed in a recess 16 formed in a corresponding inner periphery of the valve body 10.

Also, a packing 53 is provided between an inner space in the recess 16 and a corresponding corner portion of the seat holder 50. That is, the packing 53 is inserted into a packing opening 52 formed at the inner corner of the seat holder 50. The packing 53 is made of a heat-resistant and non-inflammable material to sufficiently endure a high temperature (approximately 800° C.), and it is desirable to employ a graphite material to fabricate the packing 53.

The ball valve seat according to the present invention realizes an improved anti-abrasion compared to the conventional art, by having the thin steel plate S and the thin graphite plate G stacked in an alternate order. Also, the ball valve seat carries out its function at a high temperature (over 800° C.) and a high pressure. Further, since respective side ends of the thin steel plate S and the thin graphite plate G are alternately contacted to the ball 20, whereby a solid lubricability of the graphite plate G improves the anti-abrasion of the ball valve seat.

Figure 3:
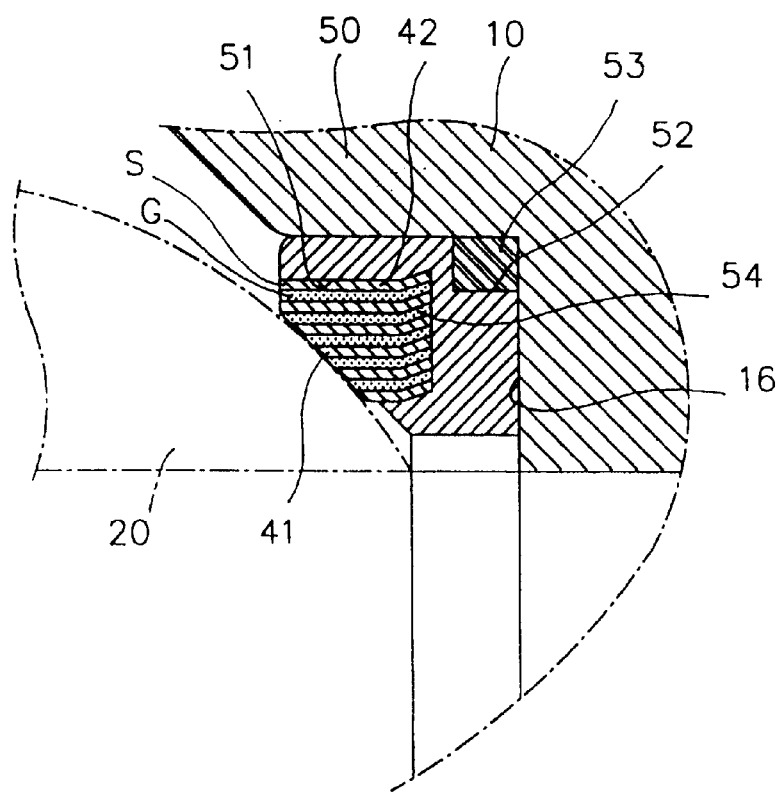
FIG. 3 is a partial enlargement view detailing a seat structure for a ball according to a second embodiment of the present invention.

FIG. 3 illustrates a seat structure for a ball valve according to the second embodiment of the present invention. As shown therein, a fixture portion on the other side of the ball contact 41 in the seat member 40 is upwardly bent to form a deviation preventing portion 42, and a deviation preventing recess 54 is formed in each inner side of the seat planting recess 51 of the holder 50, thereby preventing the seat member 40 from being deviated from the seat planting recess 51. The other elements in FIG. 3 are identical to those in the first embodiment in FIG. 2 and assigned same reference numerals, and accordingly their description will be omitted.

Figure 4:
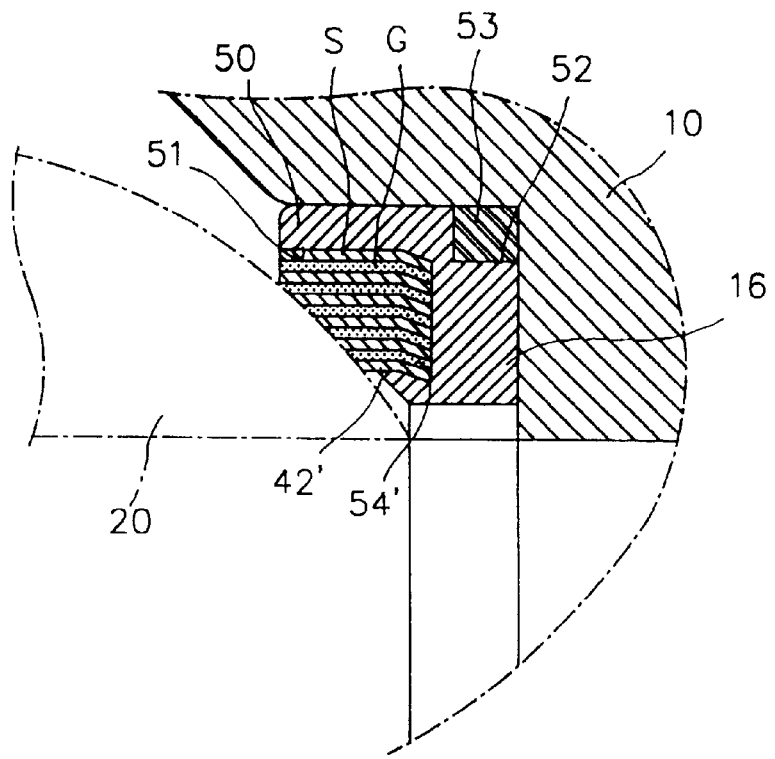
FIG. 4 is a partial enlargement view detailing a seat structure for a ball according to a third embodiment of the present invention.

Also, FIG. 4 shows a seat structure for a ball valve according to the third embodiment of the present invention. As shown therein, a deviation preventing portion 42' and a deviation preventing recess 54' are downwardly bent, contrary to the second embodiment in FIG. 3. The other elements in FIG. 4 are identical to those in the second embodiment in FIG. 3 and assigned same reference numerals, and accordingly their description will be omitted.

Figure 5:
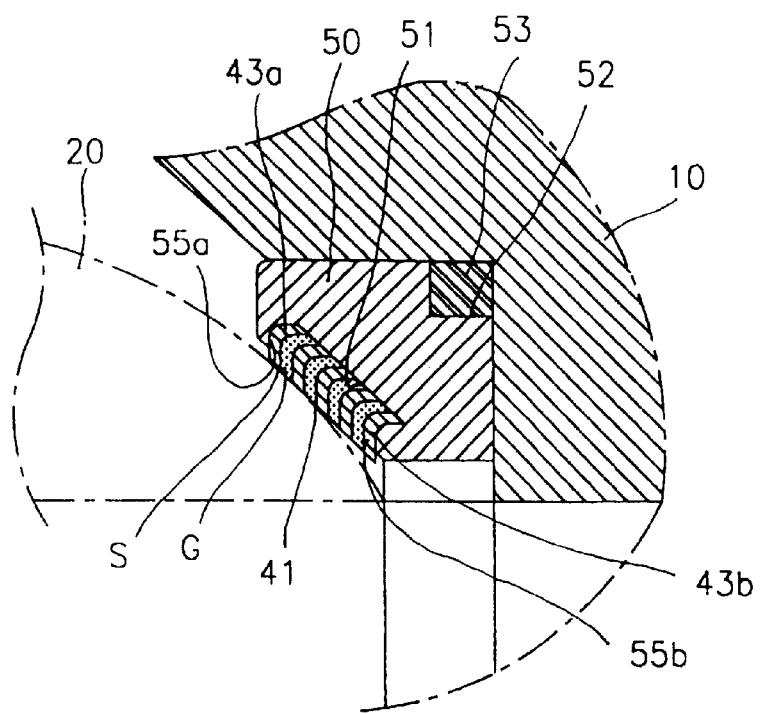
FIG. 5 is a partial enlargement view detailing a seat structure for a ball according to a fourth embodiment of the present invention.
Figure 6:
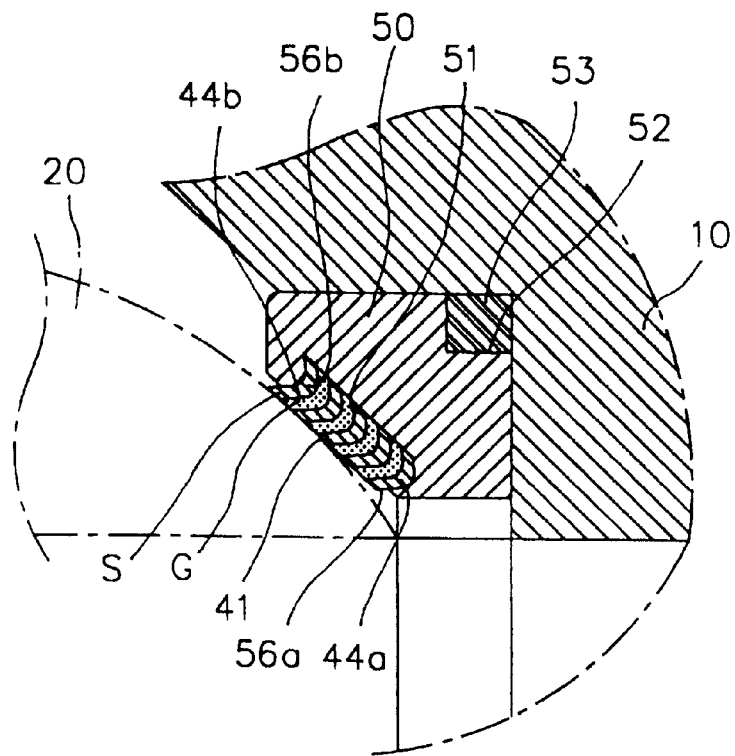
FIG. 6 is a partial enlargement view detailing a seat structure for a ball according to a fifth embodiment of the present invention.

FIGS. 5 and 6 respectively illustrate a seat structure for a ball valve according to the fourth and fifth embodiments of the present invention. A thin steel plate S and the thin graphite plate G are bent in a "<" type as illustrated in FIG. 5, or bent in a ">" type as illustrated in FIG. 6, wherein the seat planting recess 51 of the seat holder 50 allows convex portions 43a, 44a to be correspondingly inserted into concave portions 55a, 56a, and convex portions 55b, 56b to be correspondingly inserted into concave portions 43b, 44b.

Consequently, the seat structure for a ball valve according to the present invention easily form the ball contact 41 by rolling up the stacked thin steel plate S and the thin graphite plate G, thereby facilitating the fabrication process thereof.

As described above, in order to form the ball valve seat according to the present invention, the thin steel plate and the thin graphite plate are alternately stacked to obtain the ball contact, thereby improving its anti-abrasion and enabling a secure functioning of the ball valve at a high temperature and high pressure.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A seat structure for a ball valve which is disposed at an inflow vent side and an outflow vent side of a valve body, comprising a seat means planted into a seat planting recess formed in a seat holder fixed into a safety recess formed in an inner periphery of the valve body, the seat means including a fixture portion fixed into the inner periphery of the valve body, the fixture portion including a bent deviation preventing portion which is inserted into a deviation preventing recess formed in the seat planting recess, and a ball contact which is to be contacted to a valve ball provided between the inflow vent side and the outflow vent side, a portion between the ball contact and the fixture portion being bent to form a convex portion or a concave portion, and a corresponding concave portion or a corresponding convex portion being formed at the seat planting recess of the seat holder to correspond to the convex portion or the concave portion.

2. The seat structure of claim 1, wherein the seat means is planted into said seat planting recess formed in said seat holder and fixed into a safety recess formed in the inner periphery of the valve body, and the ball contact protrudes from the seat holder.

3. The seat structure of claim 2, wherein a heat-resistant packing is inserted between the safety recess and the seat holder.

4. The seat structure of claim 1, wherein the ball contact is formed along a corner portion of the seat means.

* * * * *